United States Patent [19]

Barr

[11] Patent Number: 4,602,613
[45] Date of Patent: Jul. 29, 1986

[54] SOLAR ENERGY CONCENTRATING AND COLLECTING ARRANGEMENT

[75] Inventor: Irwin R. Barr, Baltimore County, Md.

[73] Assignee: AAI Corporation, Cockeysville, Md.

[21] Appl. No.: 645,950

[22] Filed: Aug. 31, 1984

Related U.S. Application Data

[60] Division of Ser. No. 338,404, Jan. 8, 1982, abandoned, which is a division of Ser. No. 105,454, Dec. 20, 1979, abandoned, which is a continuation of Ser. No. 943,256, Sep. 15, 1978, abandoned, which is a continuation of Ser. No. 746,050, Nov. 30, 1976, abandoned.

[51] Int. Cl.$^4$ .................................................. F24J 2/38
[52] U.S. Cl. ....................................... 126/424; 126/438
[58] Field of Search ................ 126/424, 425, 438, 451

[56] References Cited

U.S. PATENT DOCUMENTS

| 503,004 | 8/1893 | Severy | 126/438 |
|---|---|---|---|
| 4,000,734 | 1/1977 | Matlock | 126/438 |
| 4,004,574 | 1/1977 | Barr | 126/438 |
| 4,121,566 | 10/1978 | Radenkovic | 126/438 |
| 4,285,330 | 8/1981 | Shook | 126/438 |
| 4,286,580 | 9/1981 | Sitnam | 126/438 |

Primary Examiner—Carroll B. Dority, Jr.
Attorney, Agent, or Firm—Reginald F. Pippin, Jr.

[57] ABSTRACT

A solar energy concentrating and collecting arrangement in which a plurality of laterally adjacent partial cylindrical oblong concave reflector-concentrators form the roof of a house, school or other building, particularly a heat utilization building, with a corresponding plurality of ganged movable collectors movably supported in spaced relation above and along the length of the oblong roof/reflectors. Each roof/reflector-concentrator has at least three radii, for enabling accommodation of wide variations of the sun angles during the various seasons of the year and during each day of a given season, while still affording a desired concentration of solar energy on the collector. The roof/reflector-concentrators are preferably substantially symmetrical in curvature and width about a vertical central plane, and face vertically upward to form an inverted modified cycloid-like surface.

51 Claims, 11 Drawing Figures

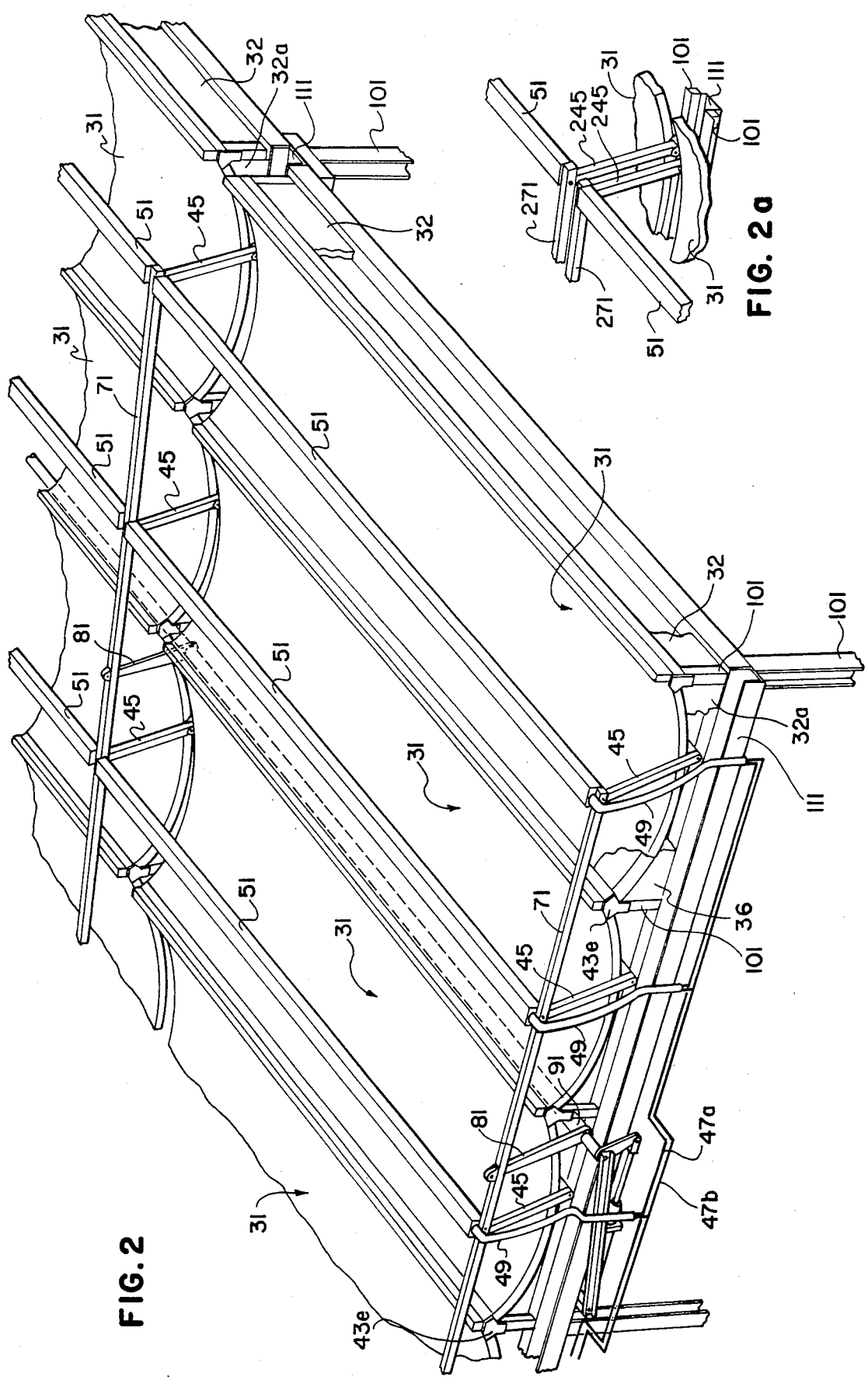

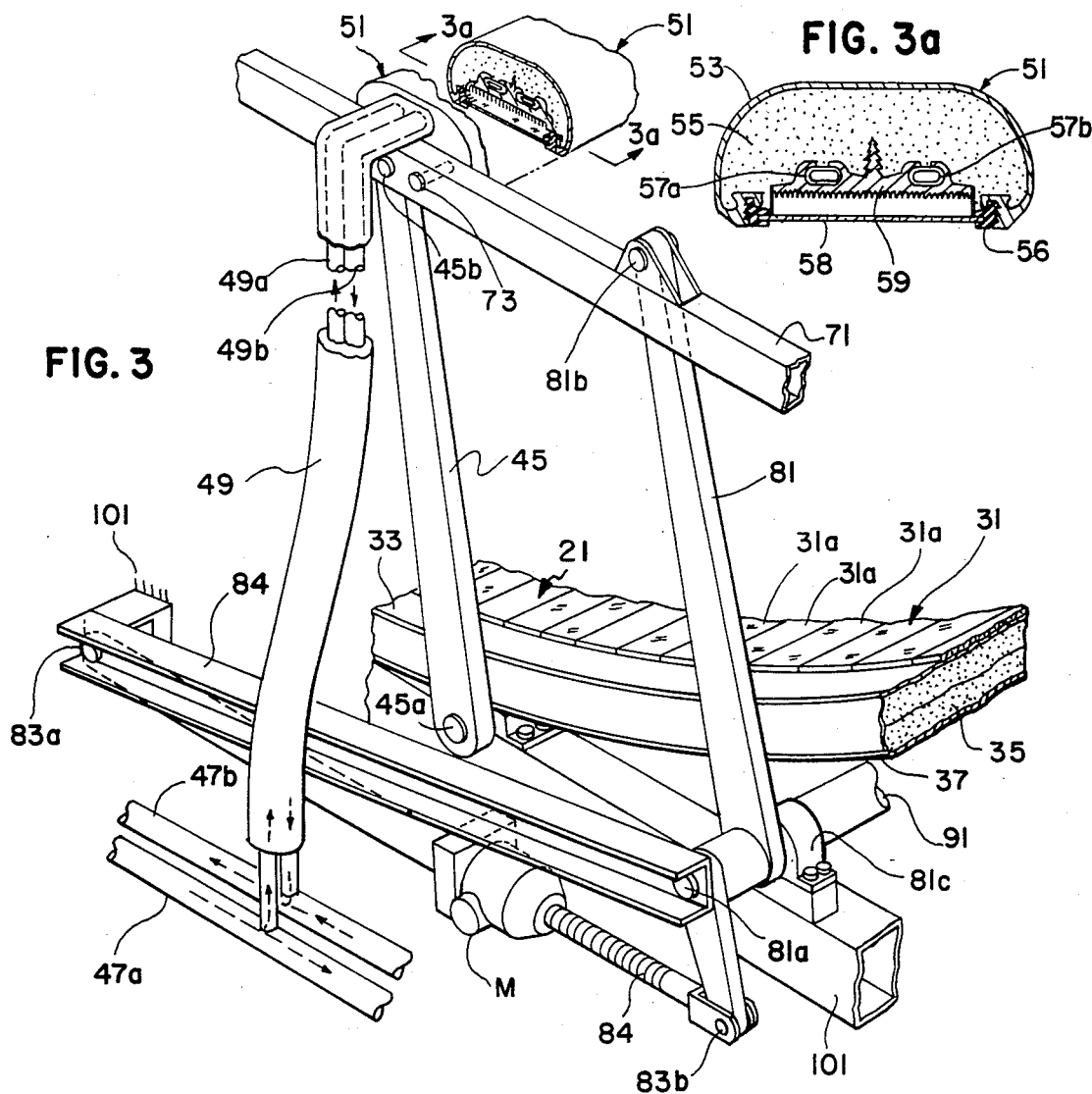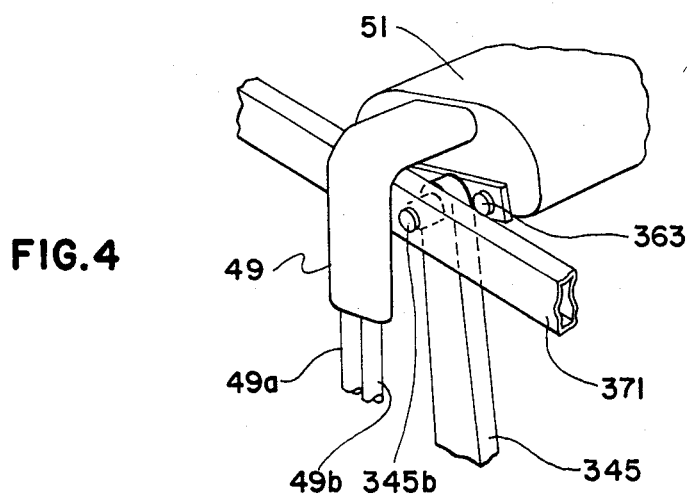

SOLAR ENERGY CONCENTRATING AND COLLECTING ARRANGEMENT

This is a division of copending application Ser. No. 338,404, filed Jan. 8, 1982 and now abandoned, which in turn is a division of Ser. No. 105,454, filed Dec. 20, 1979 and now abandoned, which in turn is a continuation of Ser. No. 943,256, filed Sept. 15, 1978 and now abandoned, which in turn is a continuation of Ser. No. 746,050, filed Nov. 30, 1976.

This invention relates to a solar energy concentrating and collecting arrangement, and more particularly to such an arrangement as applied in conjunction with a building in which the roof forms a solar energy year-round concentrator for a movable collector which is moved to various positions for maximizing of the collected solar energy as a function of the solar angle throughout the year and during each day.

Various solar energy collection arrangements are known. Many utilize a parabolic mirror or mirrors with a collector located at the focus. These mirrors and collectors conventionally move as a unit for pointing at the sun.

Several other prior arrangements employ a stationary mirror or mirrors with a movable collector or collectors. Among these are a spherical mirror construction with a movable centrally spaced collector arranged to angularly move about a fulcrum according to the position of the sun and the season of the year. The spherical mirror employs a complex curvature which is difficult, expensive, and impractical for large manufacture. A second arrangement as shown in German Pat. No. 517,417, issued Feb. 4, 1931, uses an oblong laterally symmetrical parabolic mirror with its horizontal focus line directly vertically above the center of and symmetrical with the oblong parabolic reflector. To accommodate small variations in sun angle away from the vertical, the collector is moved both laterally and vertically through a pivoted telescoping arm and cam guideway arrangement. The compass orientation of this system is not clear in view of various inconsistencies in the description. However, in any event it appears that as a practical matter very little angular movement of the sun away from the vertical (as viewed from the end of the reflector and collector) can be accommodated with this system, and certainly not the extent of annual change of sun angle relative to the horizontal. In addition the system is relatively complex and to a considerable extent unwieldy on a large scale in view of the guide cam and telescoping arm requirements. It appears that to utilize this arrangement over any extended period of days or seasons, and even during large changes of sun angle during some days of the year, the reflector would also require some form of rocking or pivoted reorientation to vary the angular position of the mirror, in addition to utilizing the cam and telescoping collector-support arm arrangement.

It is an object and feature of the present invention to provide a relatively simple solar energy concentrating and collection arrangement which enables the employment of a fixed reflector and simply movable collector while providing for practical year-round utilization during the major insolation periods in each day of the year.

It is a further object and feature of a further aspect to provide a building with the fixed roof which may have an overall configuration generally corresponding to and which may be substituted for conventional flat industrial, institutional, and residential roof configurations, and which serves as a year-round effective multiple reflector concentrator for a plurality of movable collectors which may be moved to optimize the sellection of solar energy from the roof reflections.

Still a further object and feature of another aspect of my invention is to provide apparatus for solar energy concentration and utilization, which may be utilized on a year-round practically effective basis at various latitudes, while enabling the use of a reflector which may be fixed for a given latitude position, and which may utilize a pivoted movement collector whose pivot may be fixed for a given latitude position.

Another object and feature is to enable the year-round practical concentration and collection of solar energy striking a roof without requiring passage of heat transfer fluid along and within the roof surface, as in flat plate-type solar collector arrangements.

Still other objects, features and attendant advantages will become apparent to those skilled in the art from a reading of the following detailed description of a physical embodiment and mode of practice of the invention, taken in conjunction with the accompanying drawings, wherein:

FIG. 2 is a perspective view of a portion of the roof/reflector-concentrators and collectors of the embodiment of FIG. 1, illustrating the general layout. FIG. 2a is a fragmentary enlarged view of the central pivot arm zone of a modification of the invention.

FIG. 3 is an enlarged fragmentary view, illustrating in more detail the collector support and movement-imparting arrangement.

FIG. 3A is a further enlarged cross-sectional view of the collector.

FIG. 4 illustrates a modified collector support arm connecting arrangement.

FIG. 6 is a schematic representation of a representative portion of the reflector-concentrators and collectors of the embodiment of FIGS. 1-3, with the ganged collectors being held horizontal during the parallelogram drive motion thereof, while

Figure 1:
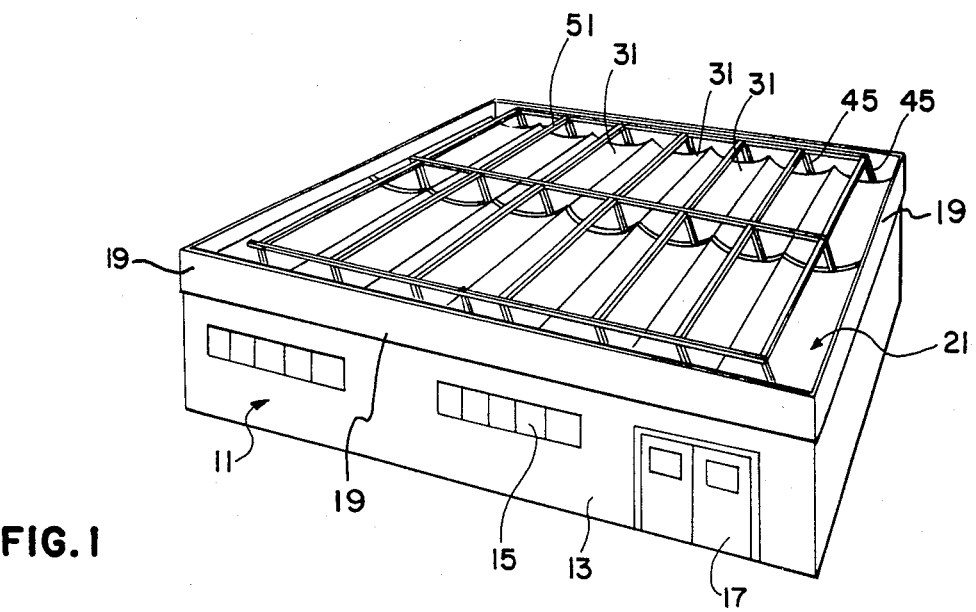
FIG. 1 is a schematic view of a building, such as a house, factory, school, etc., embodying my invention.

Referring now in detail to the Figures of the drawings, a heat utilization building structure, such as a house, school, factory, etc., generally indicated at 11, has a roof/reflector-concentrator surface 21, formed by a plurality of individual reflector-concentrators 31 and may also have a further roof surface or surfaces of any desired configuration if so desired. The extent of roof/reflector-concentrator surface 21 is generally dependent upon the amount of solar energy needed for a given desired use. For maximum energy collection from a given roof size, the entire roof may be formed as a reflector-concentrator assembly 21, as generally illustrated in the illustrative embodiment. Windows 15 and doors 17 may be provided in walls 13, as desired.

The roof/reflector-concentrator surface 21 is formed by a plurality of laterally adjacent individual reflector-connectors 31 which form effective water-tight roof sections and which are connected together at their lateral edges in substantially laterally adjoining relation to effect a water-tight roof construction. The interconnected reflector-connectors may be suitably mounted and carried on the various upright and cross members forming the load-bearing building framework 101, as through the medium of complementary concave cradles generally indicated at 36, which may be suitably spaced at the ends of the individual reflectors 31, and otherwise located if desired or needed for a given size or load. Side and end covers 32, 32a may be suitably secured along the respective sides and ends of the roof/reflector-concentrator surface 21 in order to effectively seal the sides and ends of the roof against rain entry, and gutters 111 may be provided along the ends of each bank of reflector-concentrators 31, the illustrative embodiment having two banks of reflector-concentrators 31 forming the roof 21, with three gutters at the respective outboard opposite and adjacent opposing ends of the two banks of reflectors. Rain water will thus be drained along the troughs formed by the reflectors 31 and into the gutters, from which the drain water may be discharged to the ground as through suitable downspouts or down-guttering (not shown) as necessary or desired.

A suitable facia generally indicated at 19 may be provided as an aesthetic enclosure and wind break around the reflector-concentrator roof 21, as desired, although there will be a small sacrifice in overall efficiency due to end shadowing from the facia on the reflectors 31 with the facia extending above the reflectors to any appreciable extent.

Each reflector-concentrator 31 may be formed of any suitable solar reflective material, such as metal, glass, plastic, and such materials may be of load-bearing type and provide some, a major portion, or all of the roof surface construction strength or may be of nonload-bearing substrate. The desired curvature of each roof/reflector-concentrator 31 may be formed as a smooth curve or as straight or curved line segments. For instance, a curved metal roof surface may be formed in one continuous sweep, or in several panels, or various normally straight panels of metal, glass, plastic, etc. may be utilized in suitably joined relation to form the desired overall curved shaped roof/reflectorconcentrator surface 31. The roof 21 may also be only partially reflective in parts thereof or in whole, if so desired, in order to provide for natural lighting of the interior of the building by light passage through the roof 21. Similarly, the section 31 of the roof may also transmit light to the building interior if so desired.

The roof/reflector-concentrators 31 face upwardly preferably with their opposite ends oriented directly East-West for maximum energy utilization, although other compass orientations may be utilized with less efficient operation.

Each roof/reflector-concentrator 31 reflects and concentrates solar energy into a zone of maximum confluence which varies in position as a function of the angle of the sun with respect to the horizontal, as measured in a North-South vertical plane passing through the roof 21. A solar energy collector 51 is movably mounted, as by pivot arms 45, for back-and-forth movement in a North-South direction above each respective reflector-collector 31.

The collector pivot support arms 45 are pivoted along a horizontal East-West line which may extend beneath, above or at the surface of the respective reflector-concentrator 31, with generally only small differences in effectiveness of the reflector/collector assembly 31, 51. In the illustrative embodiment, the arms 45 are mounted on pivot support bearings 45a which lie beneath the surface of the roof reflector 21. In the illustrative embodiment, as generally shown, the ratio of the reflector chord/length subtended area versus the effective collection area of the collectors 51 is approximately 15 to 1, thereby providing a maximum feasible concentration or amplification factor of no more than approximately 15 for an individual reflector/collector unit 31, 51 considered alone, although some spurious reflection from adjoining reflectors 31 may increase the pickup to some extent. Other factors, such as angle of inclination, interference of the collector 51 in passage of the sun's rays to the reflector 31 (as at summer periods), reduce the maximum possible value to a lesser possible value for various solar angles. This factor further depends upon the extent of interception of the zone of solar reflection confluence by the collector 51, as will be subsequently discussed in more detail.

The pivoted support arms 45 are preferably suitably ganged together as by linkage rods or beams 71 or the like to provide simultaneous ganged motion of the various collectors 51 relative to their respective reflector-concentrators 31. Ganged parallelogram movement of the pivoted support arms and horizontal linkage beams 71 may be suitably effected as by pivoted drive arms 81 connected through a torque tube 91 and pivotally mounted in pivot support bearings 81c on cross-members of the building framework 101, under one of the reflector-concentrators 31, as more particularly shown in FIG. 3. A support brace 84 may extend to aid in stabilizing the pivot pin 81a for drive arm 81. Pivoted back-and-forth motion of the drive arm 81 about its pivot 81a may be suitably effected by a drive motor M and screw jack 83, the screw jack being preferably of the circulating ball screw motion type, and this assembly M, 83 may be pivotally pinned and carried between a pivot pin 83a carried by the building framework and a pivot pin 83b at the lower short leg end of the drive arm 81.

The pivoted support arms 45 may be suitably pivotally mounted as indicated at 45a in respective bearings secured to the building framework 101, and the upper ends of the arms 45 may be pivotally secured to the horizontal linkage 71 through respective pivot pins 45b. The effective lengths and angles of arms 45 and 81 are the same, whereby effective parallelogram motion may be effected for this collector movement assembly.

In the preferred embodiment of FIGS. 1-3 and 6, the collectors 51 are maintained horizontal in their various positions above the respective reflector-concentrators 31, through the securement of the ends of the collectors 51 to the horizontal linkage beams 71, as through the medium of bolts 73. This horizontal facing of the collectors 51 down toward their respective reflectors aids in energy retention by the collectors 51 by minimizing heat losses particularly from convection loss which is greater with a tilted altitude of the collector receiving face.

Figure 6:
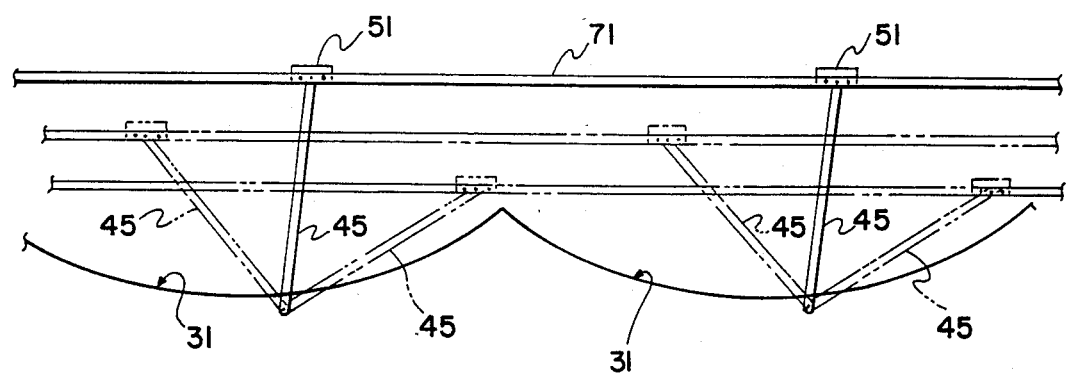
Figure 6A:
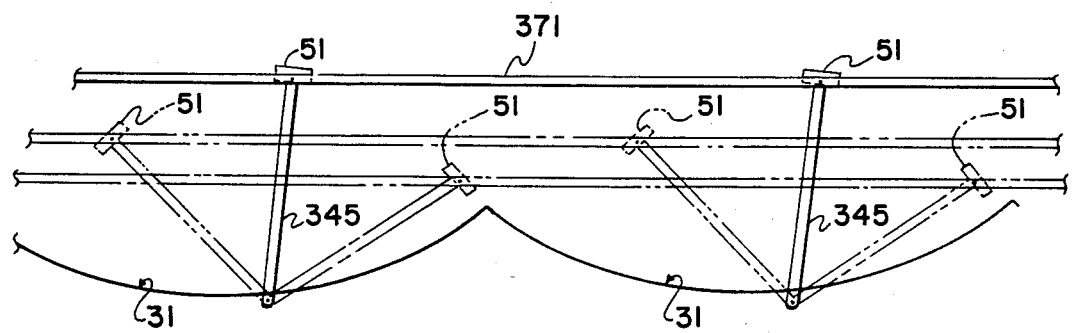
FIG. 6A is a similar schematic representation illustrating the arcuate tilting motion of the ganged collectors in the modification of FIG. 4.

Alternatively, through less desirably, the collectors 51 may be secured to the respective pivoted arms 345, as shown in FIGS. 4 and 6A, and parallelogram motion of the arms 345 and ganging linkage beam 371, pivotally interconnected as by pin 345b, will effect tilting movement of the collectors 51 as a function of pivoted movement of the arms 345.

A preferred reflector-concentrator construction is illustrated in FIG. 3, in which glass mirror segments 31a are cemented to a suitably curved sandwich formed of sheet metal 33, rigid insulating foam 35, and sheet metal 37. This construction enables the formation of a suitably rigid mirror reflector with a desired curvature, and which will withstand the necessary weather loads. The various layers of the curved sandwich 31a, 33, 35, 35 and 37 may be suitably bonded together as a unit through cement or the like, and multiple layers of foam 35 may be employed to enable ease of curve formation thereof particularly if such is not precast in the desired curvature. The glass mirror segments 31a may be omitted, with decrease in reflection efficiency being effected for most other effectively utilizable surfaces such as polished aluminum, steel, or other sheet metal or the like as the reflector surface which might thus be formed by the sheet 33 of the reflector 31 sandwich construction. Other constructions for reflector-concentrators may be utilized, as desired.

Figure 5:
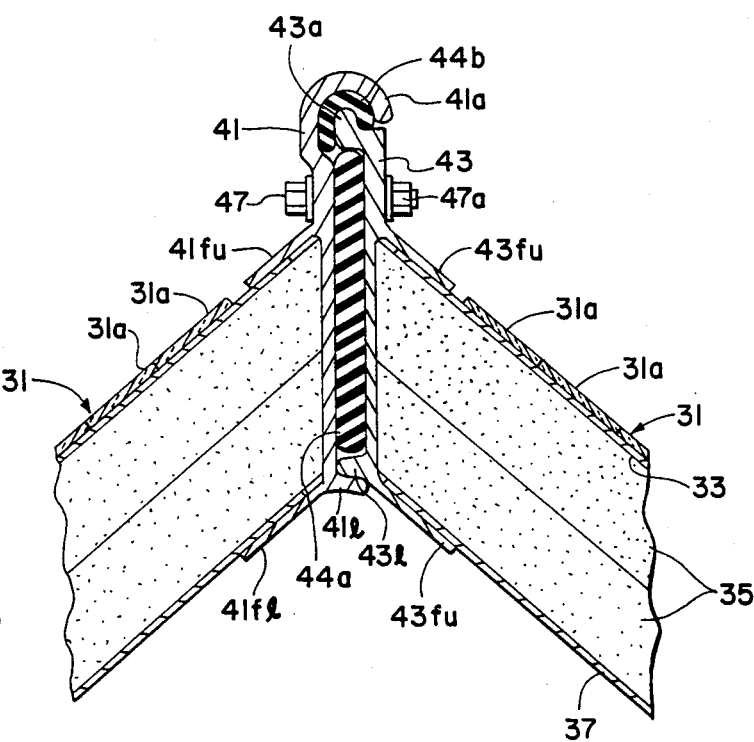
FIG. 5 illustrates a preferred arrangement for connecting adjoining reflector-concentrators.

The reflector-concentrators 31 are suitably interconnected at their adjoining edges to effect a water-tight joint. A suitable connecting arrangement is illustrated in FIG. 5, including male and female edge moldings 41, 43, which may be formed as metal (e.g. aluminum, magnesium, steel, etc.) extrusions extending along all or a major portion of the length of the adjoining reflector-concentrators 31. The male edge molding 43 has an upper male edge 43a which nests within a rubber sealing gasket 44b disposed within a reverse lip 41a of the female edge molding 41, and interfitting spacer ridges 41b, 43b run along the intermediate lower ends of the respective moldings. A further rubber sealing and mounting gasket 44a is compressed between the moldings 41, 43 within the space above ridges 411, 431, and the entire assembly 41, 43, 44a, 44b is secured together through multiple longitudinally spaced bolts 47 and nuts 47a. The longitudinal edges of adjoining reflector-concentrators 31 are retained between upper and lower angled flanges 41fu, 41fu and 43fu, 43fu on the respective interfacing edge moldings 41 and 43.

Each collector 51 may be suitably formed with a plurality of laterally side-by-side fluid flow heat transfer tubes 57a, 57b through which a suitable fluid, such as water, gas, etc. may be flowed for collection of the reflected solar energy from its respective reflector-concentrator 31. These tubes 57a, 57b may be connected for in-flow at one end and out-flow at the other end of the collector 51, or preferably as shown, may be reverse-flow interconnected at one end of the collector for increased fluid flow path length within the concentrator as well as simplified external fluid interconnection thereto and therefrom. The parallel flow tubes 57a, 57b may be suitably connected, as through flexible hose conduits 49a, 49b carried in a common protective insulating sheath on jacket 49 with common feed and return conduits 47a, 47b. Feed and return conduits 47a, 47b may be connected in parallel with in-flow and out-flow side-by-side conduits 57a, 57b of each of the collectors 51, and a heat exchange fluid, preferably liquid, such as water may be pumped through the conduits 47a, 47b, 49a, 49b and 57a, 57b.

As shown in FIG. 3, the collectors 51 are formed with their respective reflected energy absorption elements 59, 57a, 57b facing downward toward the respective reflector-concentrator, and thereby enabling the interception of the solar reflection thereto from reflector 31 at a given proper angle of this assembly. Collectors 51 preferably are insulated at their outer surfaces facing away from reflector 31, as by rigid or other plastic foam or other suitable insulation 55, with a rigid opaque wrap-around generally U-shaped structural beam-like cover element 53, which may suitably be formed as a metal extrusion. A solar energy transparent cover glass plate or plates 58 may be secured beneath the energy absorption tubes 57a, 57b, with a downwardly finned black body heat-absorbing heat-sink block secured in spaced relation above the cover glass 58, as by anchoring in the plastic foam insulation with a longitudinal ridge anchor connector running along the length of the block 59. Elastic shock-resistant seals such as soft rubber gasket seals 56 may suitably retain the cover glass 59 within the beam cover element 53. The fluid conduit tubes 57a, 57b are carried in intimate direct contact with the finned black body heat-sink block 59, as by embedding in the heat-sink block 59 or laying the tubes 57a, 57b in longitudinal grooves in the upper side of the block 59 and crimping longitudinal lips adjoining the grooves down around the tubes 57a, 57b, as illustrated. Heat absorbed by the black body finned heat-sink block will be conducted directly to the intimately held fluid passage tubes 57a, 57b and the fluid passing therethrough. This construction together with the horizontal positioning of the collectors 51 in their various lateral positions aids in effecting a desired efficiency of energy collection and transfer at the collectors while also minimizing energy losses which may occur through convection with a tilted collector altitude.

Fluid feed and return lines 47a, 47b may be suitably connected to a desired heat utilization system, such as a heat storage and building interior heating arrangement, and/or a cooling system, such as one based on absorption cooling principles. Alternatively, various machinery may be caused to perform work by the solar heat transferred to the fluid in collectors 51, or other desired and suitable heat derived work may be performed. With this invention, fluid temperatures, such as for water as the fluid, may be raised to as high as 300° F. or more, dependent on fluid flow rate, relative sizes of collector and reflector, etc. Practical heating and absorption cooling may be accomplished well within and below this temperature extent for the fluid L flowed through the collector 51.

Figure 7:
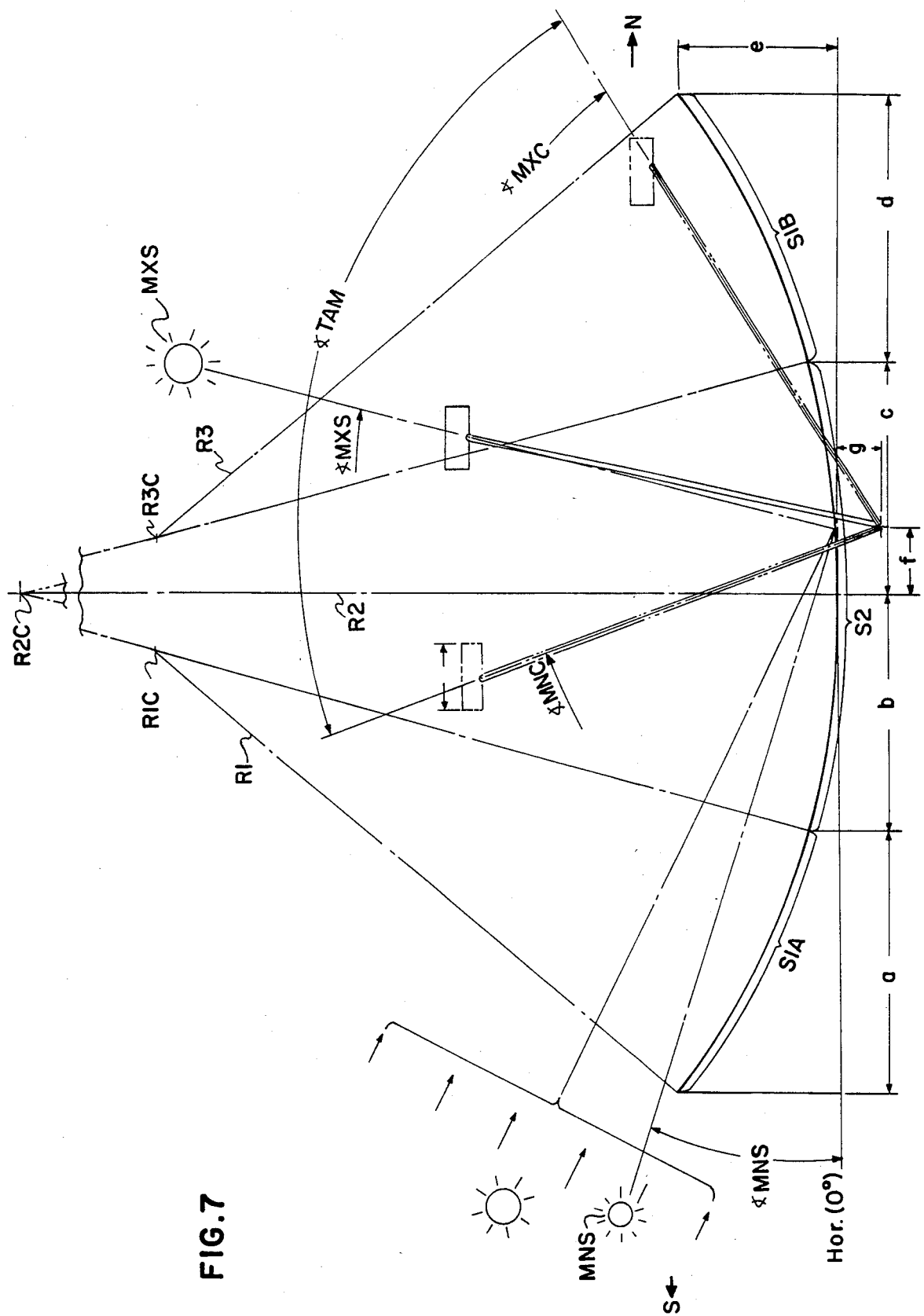
FIGS. 7 and 8 are diagrammatic illustrations of the mode of operation of a single reflector-concentrator and collector of the arrangement of FIG. 1 at various times during the year, FIG. 8 also showing various angle and dimensional relationships for a given preferred embodiment of a single reflector-concentrator and collector.
Figure 8:
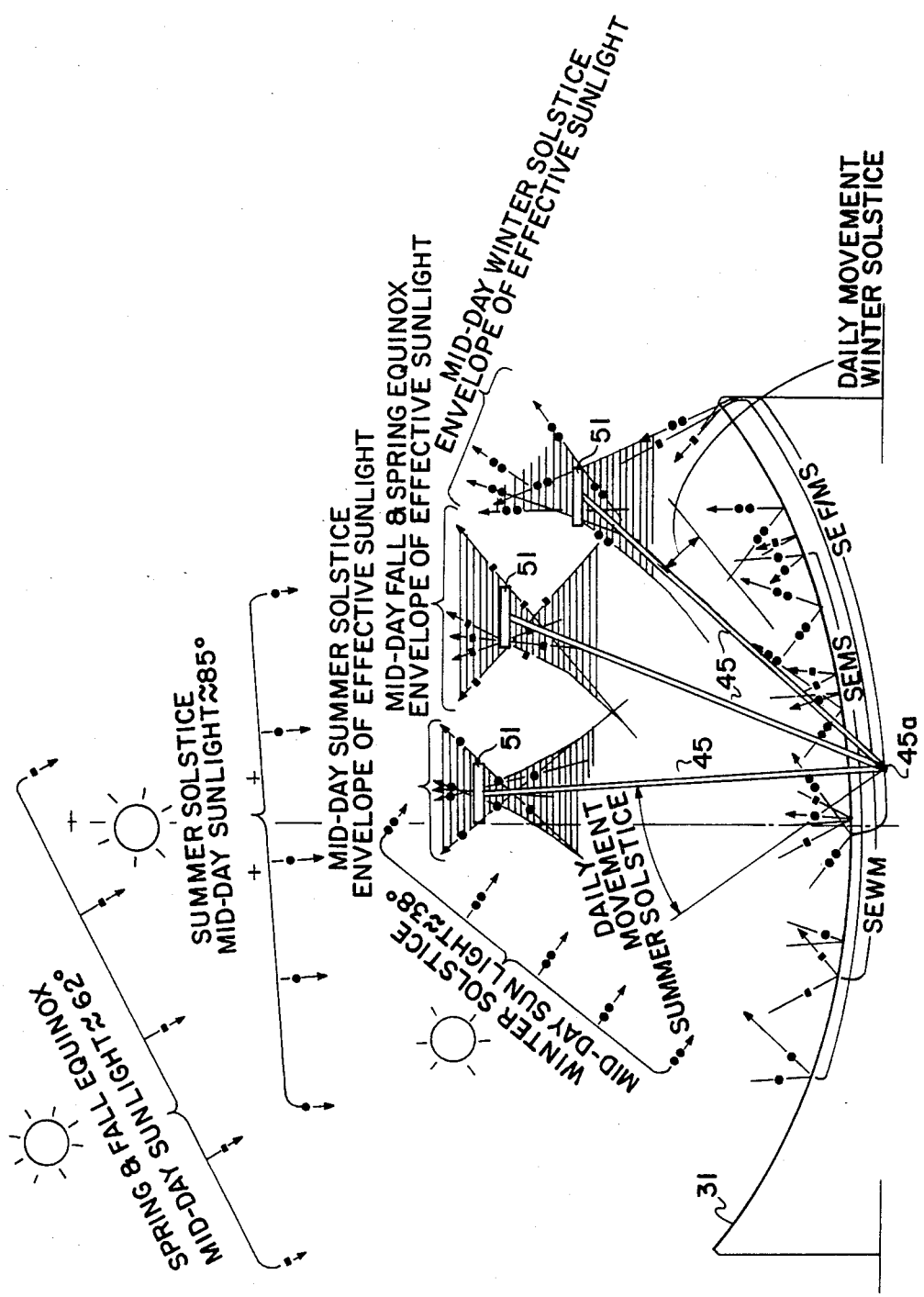

As shown particularly in FIGS. 7 and 8, the individual reflector-concentrators 31 each have a partial cylindrical concave reflecting surface which is formed of adjoining arcuate segments S1A, S2, and S1B, the opposite outermost arcuate segments being preferably identical in radius and arcuate length and being of lesser radius of curvature R1, R3 than the radius of curvature of the central arcuate segment S2. Thus the concavely curved trough segments S1A and S1B curve up at a sharper rate than does the central segment S2, and thereby aid in maximizing overall confluence of the reflected solar rays into a zone for interception by the respective collector 51 at various sun angles encountered throughout the year. Also, by providing a symmetrical trough-like concave reflector-concentrator unit 31 the adjoining reflector-concentrators 31 may be simply interconnected to form a roof of an overall flat, though obviously more detailedly undulating envelope configuration for use on building structures where such a roof is most desirable, including particularly institutional, industrial, and some residential buildings.

The vertically facing symmetrical three-radii reflector-concentrator configuration is effective to provide a substantial degree of concentration of solar energy onto the collectors 51, the precise degree of concentration varying with the sun angle, and varying generally from approximately 6:1 to approximately 10 or 11:1 concentration ratio in the illustrative embodiment for a latitude of approximately 28° North latitude. As an illustration of the effective reflected sunlight envelope intercepted by the collectors 51 at various times of the year, FIG. 8 diagrammatically shows the effective reflected solar energy envelope zones intercepted by the collector in the illustrative embodiment for various periods of the year, namely at mid-day summer solstice, mid-day spring/fall equinox, and mid-day winter solstice. The zones of effective reflection on the mirror surface of reflector-concentrator 31 are indicated respectively at SESM, SEF/SM and SEWM on this diagram.

A particular illustrative embodiment of the individual reflector-concentrators 31 and collectors 51 for a latitude of approximately 28°, such as generally illustrated, may suitably employ the following relationships, referring to FIG. 7 for reference characters and elements:

Radii R1 and R3 of front and rear arc segments S1A and S1B: 62 units
  Radius R2 of center arc segment S2: 81 units
  Effective width CW of collector 51: 6 units
  Length of pivot arm 45: $40\frac{3}{4}$ units
  Length a: 24 units
  Lengths b and c, each: 21 units
  Length d: 24 units
  Length e: $15\frac{1}{8}$ units
  Length f: $6\frac{1}{4}$ units
  Length g: 4 units
  Arc segments S1A and S1B: 27 units
  Arc segment S2: 43 units
  Minimum sun angle MNS desired to be accommodated by collector 51: 17 degrees
  Maximum sun angle MXS desired to be accommodated by collector 51: 104 degrees
  Minimum required angle MNC for collector/arm assembly 51, 45 to accommodate maximum desired sun angle (of approximately 104 degrees): 7 degrees
  Maximum required angle MXC for collector/arm assembly 51, 45 to accommodate minimum desired sun angle (of approximately 18 degrees): 147 degrees For other latitudes, particularly within the range of 0 to 40 or 50° latitudes, the same dimensions of this illustrative reflector may be utilized, if desired, with a simple change in the length of the pivot arm and the location of the pivot position 45a for movement of collector 51 as determined by a plot of the reflection angles of the sun from the various curved surfaces of the reflector-concentrator at the various sun angles encountered at the given latitude, and thereupon selecting the optimum arcuate motion path for the collector 51, which will thus dictate the arm 45 length and pivot 45a position. For instance, for a latitude of approximately 39° North the length of arm 45 is shortened to 32 units, with length f being lengthened to 21 units and length g being zero, in order to obtain a desired extent of concentrated energy collection day by day throughout the year, in this latitude location.

Determination of location of collectors 51 for each solar angle may be precisely determined for a given reflector 31, either by empirical plotting, or computer or other mathematical analysis of the confluence lines along the front-to-back extent of the reflector with the collector positioned for the particular desired maximizing of reflected solar energy interception at the various sun angles, with such compromises between maximums at various angles as may be desired for a given location and utilization. Positioning of the arms 45 and collectors 51 may be effected either on a predetermined control basis, or by energy sensing and feedback control of the drive means for movement of the collectors 51. An example of a suitable energy-sensing and feedback control means for the collector movement drive is illustrated in my copending application Ser. No. 525,545. As all of the reflector-concentrators 31 have preferably substantially identical curvatures and collectors, a single common control may thus be suitably employed for the bank of reflector-concentrators 31 forming the roof 21, with its associated collectors 51, based for instance on reflected energy-sensing pickup at one of the collectors 51, or several such pickups may be employed and utilized as a common control. Obviously, each arm 45 and collector 51 might also be separately driven and controlled if so desired, though such will not normally be desirable.

Desirably, arc segments S1A, S2 and S1B are smoothly joined at a common point of tangency, a common tangency radius line extending through the centers of radius R1C and R2C as well as R2C and R3C for the three radii R1, R2 and R3.

As previously noted, various zones of reflected solar energy influence for the illustrative embodiment are schematically shown in FIG. 8, the zones being only approximately shown and representing the midday times at approximately 28° N latitude for the sun's position at noon on each of the winter solstice, summer solstice and spring and fall equinoxes. I have found that a good ratio of energy concentration and collection can be obtained over the major insolation periods of each day of the year by utilization of three or more radii for respectively three or more of the sections of the roof reflector 21, the radii being lesser in length for arc segments increasingly spaced from the lateral center of the respective reflector-concentrator 31. In the illustrative example, three radii are satisfactorily employed, the smaller R1 and R3 defining the central vertically facing reflector surface arc segment S2, as shown schematically in FIG. 7. Referring again to FIG. 8, it will be noted that at no sun angle or reflection zone does the multiple-radii generated reflector-concentrator 31 form a single focus line, but instead forms various zones of confluence, and the size and location of the zones of confluence vary with the sun angle, which in turn varies both over the period of a year and during each day. In this respect, inspection of the sun positions for the illustrative 28° N latitude location readily show the requirements imposed on the system in given days over the period of a year. These zones are illustratively indicated in FIG. 8, and designated as daily movement zones for the collectors 51 and their supporting pivot arms 45. It will be noted from FIG. 8 that the reflector can and does accommodate solar angles to a limited degree behind the 90° vertical. Of course, the side or end angle of inclination must also be considered, and in order to maximize solar energy collection at low end angles the same as measured in the East-West vertical plane, the reflectors 31 and collectors 51 should desirably be relatively long along their length, particularly with respect to the distance of the collectors 51 from the reflectors 31.

As the days approach the spring and fall equinoxes the daily excursions of movement required for the ganged arm/collector assemblies 45, 51 decrease, until at the respective two equinoxes the ganged arm/reflector assemblies 45, 51 require no angular movement as the sun rises and sets on the East-West orientation line of the reflector axes, and forms a constant angle throughout the day as measured in a North-South vertical plane passing through the reflectors 31.

In the illustrative embodiment, the solar concentration factors, or amplification factors, vary with the solar angle. The concentration or amplification factor is a function of the extent of coverage or interception of the zone of confluence of the reflected solar energy at a given sun angle, and it is therefore desirable to maximize this extent of interception at the various angular positions of the sun and the collector/arm assemblies 51, 45, insofar as is practical and economical.

I have found that by mounting the arms 45 on respective pivot axes near the surface of reflectors, as at, above or preferably beneath the reflector surface, an adequate extent of interception of the various zones of solar energy confluence may be obtained for the collector 51. In the illustrative embodiment the horizontal pivot line for pivot support arms 45 is disposed slightly beneath the effective reflective surface of respective reflectors 31, and is spaced from the center of longitudinal center line of the reflector 31 in a direction away from the Equator, the extent of desired displacement varying with the latitude of the user location. However, this arm pivot line may if desired be otherwise located for a given embodiment, as for instance above or at the surface of reflector 31.

In the modification illustrated in FIG. 2A, the common center pivot arms 45 for the longitudinally paired collectors 51 of the two banks of reflectors 31 are replaced by separate individual center zone individual pivot support arms 245, and the respective longitudinally paired collectors 51 of the two side-by-side banks of reflector/collector units are individually tied together only through the common drive torque tube 91 which serves to impart pivotal movement to the parallelogram linkage 45, 81, 71, 245, 271, 81, 245, 271, 81, etc. for each end of the ganged groups of collectors 51, 51 etc.

It will, of course, be appreciated that all of the drawings are only illustrative and are not themselves intended to be illustrated necessarily in true size relationships, although such is to some extent approximately the case, as particularly in FIG. 7. This observation applies also to the zones of solar reflection confluence and the collector 51 interception zones, although such are shown to give a fairly indicative illustration of the principles and mode of operation and practice involved.

The typical specific illustrative example proportions as previously shown and described, particularly with respect to FIG. 7, are, as previously noted, for an embodiment and practice of the invention primarily within a latitude of approximately 28°. Also, as noted, the embodiment is arranged such that the concentration factors for summer, spring and fall solar energy collection are maximized, to some extent at the expense of winter concentration factors, in order to maximize available solar-derived heat energy for air conditioning, (although still enabling the satisfaction of minimum requirements for heating during at least the major portion of most winter conditions).

While the invention has been illustrated and described with respect to particular illustrative embodiments and modes of practice, and various possible modifications have been described, it will be appreciated that various further modifications and improvements may be made without departing from the scope and spirit of the invention. For instance, the reflectors 31 may be formed as a single or multiple reflector assembly only, and not as a roof of the building, although this is normally the most advantageous and preferred embodiment. Further, while a pivoted support arm arrangement 45, and particularly a ganged movement arrangement, is illustrated and preferred for supporting and moving the collectors 51 through the desired zone of movement, various other collector supporting and movement arrangements may be employed. Also, while three radii R1, R2 and R3 are employed in the illustrative example, especially for simplicity of design and construction, more than three radii may be suitably employed, graduating from shortest at the front and rear to the longest at the center zone of the reflector-concentrator 31, and may in fact be constructed with a continuously varying radius from front to back of the reflector 31. Such a continuousl varying radius reflector 31 may, however, be beyond the desired complexity for normal construction and the triple radius construction is considered to be adequate and most easily constructed from a practical standpoint. Accordingly, the invention is not to be limited to the particular illustrative embodiment and mode of operation and practice, but only by the scope of the appended Claims.

I claim:
1. A solar energy concentrating and collecting arrangement, comprising
   a generally upwardly facing concave generally partial cylindrical trough reflector fixedly positioned during operational reflection and having three radii, each radius forming an effective overall arc segment along the effective partial cylindrical length of said reflector,
   the center of radius of each of said radii lying on a respective axis line extending along the longitudinal extent of said partial cylindrical trough reflector,
   and a collector having a longitudinal extent extending along the length said reflector and disposed in parallel spaced relation from the effective reflecting surface of said reflector and movable support means movably supporting said collector for movement transversely of its longitudinal extent across a portion of the arcuate width of said reflector to enable selected positioning of said collector at varied lateral positions across the width of said reflector as a function of sun angle of elevation for maximizing pickup of reflected solar energy from said operationally fixed position reflector,
   said reflector having a first concave radius of curvature along the effective length of a first cylindrical concentrating reflective arc segment thereof, and a second and third lesser concave radii of curvature along the effective length of second and third concentrating reflective cylindrical arc segments thereof said first large radius cylindrical concentrating reflective arc segment lying between said second and third lesser radii arc segments, said reflector thereby providing a generalized spatially movable focal zone laterally spatially movable relative to said reflector through and as a function of a wide range of transverse sun intercept angles relative to the reflector, and each of said lesser radii cylindrical arc segments being inclined at a lesser angle to the vertical than said first concave concentrating larger radius reflective arc segment.

2. An arrangement according to claim 1,
said radii including two radii forming intersecting effective arc segments substantially tangent at the zone of intersection thereof,
said two radii having their respective centers of radius lying at spaced positions on a radius line passing through said zone of substantial tangency of said intersecting effective arc segments.

3. An arrangement according to claim 1,
said three different radii cylindrical arc segments being effectively contiguous to one another along the straight cylindrical length thereof.

4. An arrangement according to claim 1,
an imaginary chord passing between the effective longitudinally extending bounding edges of said second lesser radius arc segment being tilted toward the Equator,
and an imaginary chord passing between the effective longitudinally extending bounding edges of said third lesser radius arc segment being tilted away from the Equator.

5. An arrangement according to claim 1,
said second and third lesser radii being substantially equal.

6. An arrangement according to claim 1,
said collector being movable across a portion of the arcuate width of said reflector to enable maximizing of collection of solar energy thereby.

7. An arrangement according to claim 6,
and means for moving said collector across a portion of the arcuate width of said reflector.

8. An arrangement according to claim 7,
and pivotally mounted support arms supporting said collector for movement across a portion of the arcuate width of said reflector.

9. An arrangement according to claim 8,
said support arms having pivot support means therefor disposed adjacent the surface zone of said reflector.

10. An arrangement according to claim 9,
said pivot support means forming a pivot axis for said arms along a line spaced beneath said reflector surface.

11. An arrangement according to claim 9,
said pivot support means forming a pivot axis for said arms along a line lying generally at said reflector surface.

12. An arrangement according to claim 9,
said pivot support means forming a pivot axis for said arms along a line lying generally above said reflector surface.

13. An arrangement according to claim 9,
said pivot support means forming a pivot support axis for said arms along a line parallel to the radii axes of said arc segments and spaced off-center of said reflector in a direction toward one of said second and third arc segments.

14. An arrangement according to claim 13,
the combined arc segment formed by said first larger radii arc segment and said second and third smaller radii arc segments being substantially arcuately symmetrical about its arcuate center and facing substantially vertically.

15. An arrangement according to claim 1,
said pivot support means forming a pivot support axis for said arms along a line parallel to the radii axes of said arc segments and spaced off-center of said reflector in a direction toward one of said second and third arc segments.

16. An arrangement according to claim 15,
the combined arc segment formed by said first larger radii arc segment and said second and third smaller radii are segments being substantially arcuately symmetrical about its arcuate center and facing substantially vertical.

17. An arrangement according to claim 1,
the combined arc segment formed by said first larger radii arc segment and said second and third smaller radii are segments being substantially arcuately symmetrical about its arcuate center and facing substantially vertical.

18. An arrangement according to claim 1,
said reflector arc segments forming a substantially arcuately symmetrical reflector surface facing substantially vertically,
and further comprising a plurality of said reflectors forming a scalloped surfaced reflective roof, and a corresponding plurality of collectors for respective said reflectors.

19. An arrangement according to claim 18,
said reflectors being joined along their upper adjacent longitudinal edges.

20. An arrangement according to claim 18,
said collectors being gang connected for common movement across the arcuate reflective surface of their respective reflectors.

21. A solar energy concentrating and collecting arrangement, comprising
a generally upwardly facing concave generally partial cylindrical trough reflector fixedly positioned during operational reflection and having three radii, each radius forming an effective overall arc segment along the effective partial cylindrical length of said reflector,
each of said radii lying on a respective axis line extending along the longitudinal extent of said partial cylindrical trough reflector,
and a collector having a longitudinal extent extending along the length of said reflector and disposed in parallel spaced relation from the effective reflecting surface of said reflector and movable transversely of its longitudinal extent across a portion of the arcuate width of said reflector to enable selected positioning of said collector at sequentially varied lateral positions across the width of said reflector as a function of sun angle of elevation,
said reflector having a first concave radius of curvature along the effective length of a first cylindrical concentrating reflective arc segment thereof, and a second and third lesser concave radii of curvature along the effective length of second and third concentrating reflective cylindrical arc segments thereof, said first larger radius cylindrical concentrating reflective arc segment lying between said second and third lesser radii arc segments, each of said lesser radii cylindrical arc segments being inclined at a lesser angle to the vertical than said first concave concentrating larger radius reflective arc segment, said reflector arc segments forming a substantially arcuately reflector surface which is substantially arcuately symmetrical about its arcuate center and which faces substantially vertically, further comprising a plurality of said reflectors forming a scalloped surfaced reflective roof, and a corresponding plurality of collectors for respective said reflectors, said collectors being gang-connected through a parallelogram movement linkage, formed by a plurality of pivoted lever arms, for common movement of said collectors across the arcuate reflective surface of their respective collectors.

22. A solar energy concentrating and collecting arrangement comprising an inverted-cycloid-like shaped reflector roof surface formed by a plurality of laterally adjoining semi-cylindrical operationally fixedly positioned solar contiguous trough reflector-concentrators, and a corresponding plurality of movable longitudinal collectors for respective said reflector-collectors, and movable support means for movably supporting each of said collectors for movement across a portion of the arcuate width of its respective associated reflector to enable selected positioning of said collectors at varied lateral positions across the width of the respective said reflectors as a function of sun angle of elevation while maintaining said reflectors in fixed condition for maximizing pickup of reflected solar energy from said operationally fixed position reflector, each of said reflector-concentrators and associated collectors forming a discrete concentrator collector unit comprising an upwardly facing concave generally semi-cylindrical multiple radii reflector forming a watertight roof segment across its width and fixedly positioned during operational reflection and which provides a generalized laterally spatially movable focal zone laterally spatially movable relative to said reflector through and as a function of a wide range of transverse sun intercept angles relative to the reflector, and a said laterally movable collector having a longitudinal extent extending along the length of said reflector and disposed in spaced relation from the effective reflecting surface of said reflector and movable across a portion of the arcuate width of its respective said reflector, and fluid flow conduit means connecting in fluid flow relation between said collectors for comonality of fluid heating by said plurality of roof-forming-reflector-concentrator and collector units.

23. An arrangement according to claim 22,
said reflectors being gang connected together along their upper adjacent longitudinal edges.

24. An arrangement according to claim 22,
said collectors being gang-connected for common movement across the arcuate reflective surface of their respective reflectors.

25. An arrangement according to claim 24,
and means holding said collectors against pivotal movement during motion thereof relative to their respective reflectors.

26. An arrangement according to claim 25,
and means holding said collectors horizontal and facing downward toward their respective reflectors during motion of said collectors relative to their respective reflectors.

27. An arrangement according to claim 22,
said movable support means comprising pivoted support arms,
said collectors being mounted on said support arms for pivotal movement,
and tilting means tilting said collectors relative to their respective reflectors during pivotal movement of said support arms and associated reflectors.

28. An arrangement according to claim 27,
said collectors being gang-connected for common movement across the arcuate reflective surface of their respective reflectors.

29. An arrangement according to claim 22,
and means holding said collectors against tilting movement during motion thereof relative to their respective reflectors.

30. An arrangement according to claim 29,
and means holding said collectors horizontal and facing downward toward their respective reflectors during motion of said collectors relative to their respective reflectors.

31. A building structure comprising
a building enclosure having a roof surface,
said roof surface being formed of a plurality of adjacent watertight segments each comprising an upwardly facing concave partial cylindrical multiple radii fixed trough reflector providing a generalized laterally spatially movable focal zone laterally spatially movable relative to the respective said reflector trough and as a function of a wide range of sun intercept angles relative to the respective said reflector, a corresponding plurality of longitudinal collectors each laterally movable above and across a portion of the arcuate width of the face of its respective reflector to enable selected positioning of said collectors at sequentially varied lateral positions across the width of the respective said reflectors as a function of sun angle of elevation for maximizing pickup of reflected solar energy from said operationally fixed position reflector, and movable support means movably supporting said collectors for said movement above and across the face of their respective reflectors.

32. A building structure according to claim 31,
each of said reflectors being comprised of a plurality of effectively curved segments of different effective radius of curvature,
each of said reflectors being substantially arcuately symmetrical about its arcuate center.

33. A building structure according to claim 32,
each of said reflectors having three substantially adjoining partial cylindrical sections in which the respective adjoining sections have a different effective radius of curvature from one another.

34. A building structure according to claim 33,
the first and third of said partial cylindrical sections having substantially the same radius extent,
the second of said sections facing substantially vertically.

35. A building structure according to claim 34,
the second of said three sections facing substantially vertically.

36. A building structure according to claim 35,
the second of said three sections having a longer radius of curvature than the first and third of said sections.

37. A building structure according to claim 31,
each of said reflectors being substantially arcuately symmetrical about its arcuate center.

38. A building structure according to claim 37,
each of said reflectors having three substantially adjoining partial cylindrical sections in which the respective adjoining sections have a different effective radius of curvature from one another.

39. A building structure according to claim 38,
the first and third of said partial cylindrical sections having substantially the same radius, the second of said sections facing substantially vertically.

40. A building structure according to claim 39,
the second of said three sections facing substantially vertically.

41. A building structure according to claim 40,
the second of said three sections having a longer radius of curvature than the first and third of said sections.

42. A building structure according to claim 39,
the second of said three sections having a longer radius of curvature than the first and third of said sections.

43. A building structure according to claim 31,
each of said reflectors having three substantially adjoining partial cylindrical sections in which the respective adjoining sections have a different effective radius of curvature from one another.

44. A building structure according to claim 43,
the first and third of said partial cylindrical sections having substantially the same radius, the second of said sections facing substantially vertically.

45. A building structure according to claim 44,
the second of said three sections facing substantially vertically.

46. A building structure according to claim 45,
the second of said three sections having a longer radius of curvature then the first and third of said sections.

47. A building structure according to claim 44,
the second of said three sections having a longer radius of curvature than the first and third of said sections.

48. A building structure according to claim 31,
each of said reflectors being formed of a plurality of individual longitudinal glass mirror segments secured in laterally side-by-side relationship to form an overall effective curved reflector surface.

49. An arrangement according to claim 1, further comprising
means for moving said collector laterally above said reflector across a portion of the arcuate width of the reflector as a function of the angle of sun elevation taken in a direction normal to the longitudinal axis of said reflector to maintain the collector within the beam of reflected solar energy as the reflected beam moves across the lateral width of the reflector as a function of variation of said sun elevation angle.

50. An arrangement according to claim 22, further comprising
means for moving said collectors laterally in ganged connected relation above their respective said reflectors across a portion of the arcuate width of the respective reflectors as a function of the longitudinal axis of said reflectors, to maintain the collectors within the beam of reflected solar energy as the reflected beam moves across the lateral width of the reflectors as a function of variation of said sun elevation angle.

51. An arrangement according to claim 31, further comprising
means for moving said collectors laterally in ganged connected relation above their respective said reflectors across a portion of the arcuate width of the respective reflectors as a function of the angle of sun elevation taken in a direction normal to the longitudinal axis of said reflectors, to maintain the collectors within the beam of reflected solar energy as the reflected beam moves across the lateral width of the reflectors as a function of variation of said sun elevation angle.

* * * * *